Oct. 20, 1970 R. S. BOWLES ET AL 3,535,411
BLOW-MOLDING OF PLASTIC CONTAINERS WITH
INTERNAL REINFORCING STRUCTURE
Filed Feb. 23, 1968

INVENTOR.
Richard S. Bowles
Charles W. Hurst
BY
Frederick H. Braun
ATTORNEY

United States Patent Office 3,535,411
Patented Oct. 20, 1970

3,535,411
BLOW-MOLDING OF PLASTIC CONTAINERS WITH INTERNAL REINFORCING STRUCTURE
Richard S. Bowles, Wyoming, and Charles W. Hurst, Cincinnati, Ohio, assignors to The Procter & Gamble Company, Cincinnati, Ohio, a corporation of Ohio
Filed Feb. 23, 1968, Ser. No. 707,768
Int. Cl. B29c 17/07
U.S. Cl. 264—98
2 Claims

ABSTRACT OF THE DISCLOSURE

Plastic bottles are blow-molded with internal reinforcing strut and rib structures by using a blowing mold provided with opposed inwardly projecting pins or like elements. When the mold is closed around the parison, the inwardly projecting pins pinch the parison intermediate its ends. During the step of air blowing, the parison is inflated and forced against the internal mold surfaces and around the pins to form inwardly projecting reinforcing members in the bottle. A reinforcing rib extending from the inwardly projecting members may also be formed if the parison:pin diameters are fixed at a ratio of no greater than 7:1.

RELATED APPLICATION

The subject matter disclosed and claimed in the present application is particularly useful in the manufacture of plastic bottles of the type described and claimed in the copending application of Richard S. Bowles, Ser. No. 707,-769, filed Feb. 23, 1968, now U.S. Pat. 3,474,927, issued Oct. 28, 1969, which is entitled Plastic Container with Internal Reinforcing Structure. The issued patent of Bowles is commonly owned and assigned to the assignee of the present application.

BACKGROUND OF THE INVENTION

The invention is in the field of blow-molding plastic containers or bottles having relatively thin walls such as commonly used commercially for packaging many types of liquid products, including, among others, liquid detergents, liquid fabric softeners, liquid bleaches and the like. Conventional plastic bottles presently in use for the commercial packaging and sale of such products are characterized by walls having such a thin cross section that they are subject to flexing when normally handled by the typical consumer. When a consumer holds a bottle of this kind to remove the cap and dispense the product, it is not uncommon for the side walls to deflect sufficiently to cause the bottle to "burp" thereby expelling some product on the side surfaces due to the sudden and unexpected decrease in its internal volume. This phenomenon has been experienced by most persons who have handled and manipulated such bottles in the dispensing of products of this kind. The resultant mess that accompanies this undesirable phenomenon is difficult to avoid unless it is anticipated and the bottle is handled with undue care. This is, in effect, a serious drawback since the typical consumer is not always immediately aware of this problem while normally dispensing product.

The manufacture of bottles with internal reinforcing structure has not had much, if any, prior success in the plastic blow-molding art. Thus the present inventors were faced with the problem of devising a method for efficiently and easily blow-molding bottles having internal reinforcing structures of the kind generally described in the aforesaid Bowles application. One of their major objectives was to devise a method which could accomplish this goal without substantial modification to conventional blow-molding equipment and with no reduction in production speeds necessary to meet the economics of the plastic blow-molding industry. The present invention has met these difficult requirements.

SUMMARY OF THE INVENTION

The nature and substance of the invention can be briefly summarized as a method and apparatus for blow-molding plastic bottles or containers with internal reinforcing structure by first extruding a parison between the halves of an open blowing mold each of which contains oppositely disposed inwardly projecting tapered pins intermediate the ends of the mold cavity. When the blowing mold is closed around the parison, a limited area in the central portion of the parison is pinched off by the tapered pins which preferably come together with a clearance less than 2 times the wall thickness of the extruded parison. The parison is then inflated in the mold which forces its wall against the inside contour of the mold cavity. The resultant bottle is formed with oppositely disposed inwardly projecting members across its central portion which in a preferred embodiment are fused at their inner ends to form a strut. A reinforcing rib structure extending inwardly from the inwardly projecting members can be formed by holding the diameter of the pin to the diameter of the parison at a ratio no smaller than 1:7.

BRIEF DESCRIPTION OF THE DRAWINGS

While the specification concludes with claims particularly pointing out and distinctly claiming the subject matter regarded as forming the present invention, it is believed the invention will be better understood from the following description taken in connection with the accompanying drawing in which:

DESCRIPTION OF THE PREFERRED EMBODIMENT

The present invention can be applied and used with any conventional well-known blow-molding equipment adapted to make conventional thin-walled plastic bottles. The blow-molding equipment need only be modified as described herein in order to produce bottles with internal reinforcing structures of the kind described, for example, in the aforesaid application of Bowles. The material for making the bottles can be any well-known plastic that is suitable for blow-molding such as polyethylene, polypropylene or like materials. The shape of the bottle is entirely immaterial, the shape selected for the present description having been taken purely for convenience.

Figure 1:
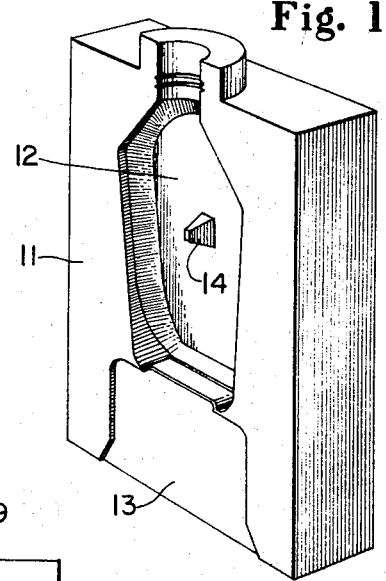
FIG. 1 is an isometric drawing of one half of a blowing mold used in the practice of the present method illustrating a preferred location for the central pin used for pinching the parison.

FIG. 1 illustrates one half 11 of a blowing mold having a bottle cavity 12 and a pinch-off insert 13. The blowing mold half 11 is of generally conventional construction, the only modification therein being the provision of a pin 14 which is preferably tapered. The tapered pin 14 projects inwardly at the point in the mold where it is desired to form an inwardly projecting reinforcing member at the central portion of the bottle. While the pin 14 is shown in the shape of a truncated pyramid, it can also assume other shapes including that of a truncated cone, or any other configuration, the only requirement being that the pin 14 must be tapered.

The mating half 15 (FIG. 2) of the blowing mold is similarly fitted with a pin 16 (FIG. 3) directly opposite the pin 14 and in line with the direction of travel of the two halves of the blowing mold as they are successively brought together and parted. The pins 14 and 16 extend inwardly toward the mold parting line 17. They are preferably positioned in the mold at the area of the bottle where an increase in cross directional strength is desired.

Figure 2:
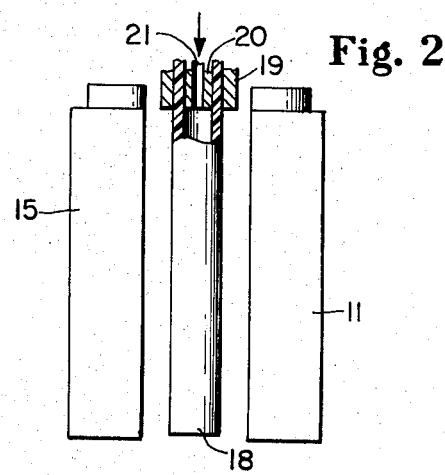
FIG. 2 is a fragmentry elevation of the separated halves of the blowing mold showing a parison extruded downwardly therebetween.

The two halves 11 and 15 of the blowing mold are illustrated in the mold open position in FIG. 2. When in this position, a parison 18 is extruded from the die 19 which may be a typical parison crosshead and die as well known in the commercial blow-molding art. The die 19 includes a die mandrel 20 having an opening 21 which can be used for the introduction of a blast of air at the appropriate time in the blow-molding cycle.

Figure 3:
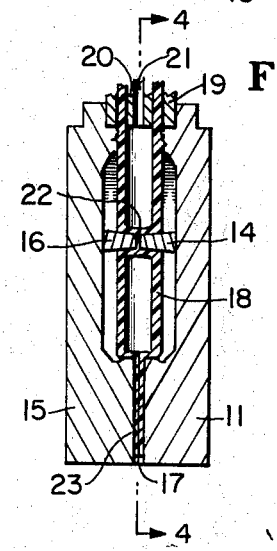
FIG. 3 is an elevation in cross section showing the blowing mold in closed position around the parison which shows the manner in which the parison is pinched in its central portion.
Figure 4:
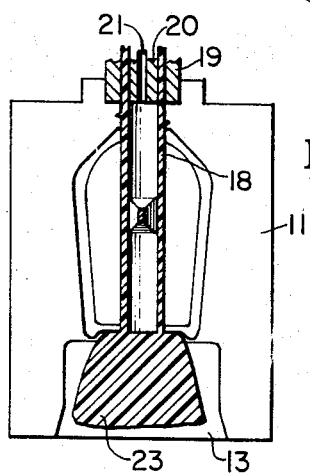
FIG. 4 is a fragmentary elevation in cross section showing another view of the parison being pinched and taken on the line 4—4 of FIG. 3.

The mold halves 11 and 15 are brought together and closed around the parison 18 as illustrated in FIG. 3. In so doing, the ends of the parison are pinched off and the tapered pins 14 and 16 come together and pinch the parison in a limited area intermediate its pinched off ends. When in the closed position of FIG. 3, the ends of the pins 14 and 16 are preferably spaced apart a distance less than twice the thickness of the parison wall thickness such that the pinched area 22 becomes fused together in the process of blow molding the bottle. The resin tail 23 is formed as in any conventional blow-molding process in the pinch-off insert area 13 of the mold halves. FIG. 4 illustrates the conditions of the parison 18 when the blowing mold is in closed position as viewed from the parting line prior to the inflation of the parison by an air blast.

Figure 5:
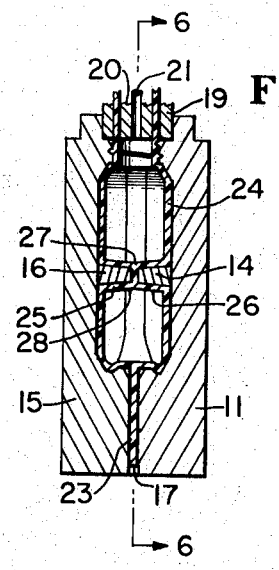
FIG. 5 is an elevation in cross section showing the completed bottle after the blowing mold is inflated, the view being similar to FIG. 3.

As a next step, an air blast is introduced through the opening 21 to inflate the parison 18 into the form of a bottle 24 as shown in FIG. 5. In so doing, inwardly projecting members 25 and 26 are formed around the pins 16 and 14, respectively. In a preferred embodiment the members 25 and 26 are fused at 27 to form a continuous strut 28, i.e., when the ends of the pins 14 and 16 are spaced apart at a distance less than twice the thickness of the parison wall. The plastic material of the bottle is subsequently cooled, and the blowing mold is separated to allow the completed bottle to be removed.

Figure 6:
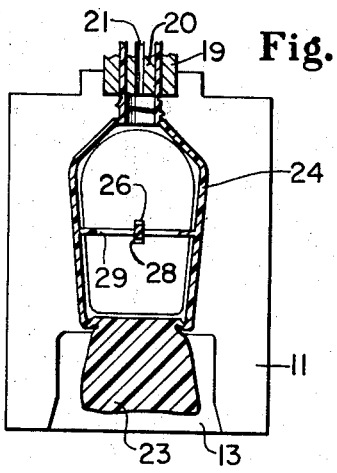
FIG. 6 is an elevation in cross section showing the blown bottle and the rib formed therein taken on the line 6—6 of FIG. 5.

FIG. 6 illustrates a cross section of the bottle 24 in the blowing mold half 11. A rib 29 extending from either side of the strut 28 has been formed around the inside wall of the bottle. This rib is formed by the stretching and thinning down of the plastic at the sides of the pins 14 and 16 simultaneously with the outward flow of the plastic material from the pins as the parison is blown out to the wall of the blowing mold.

The degree of web formation is controlled by a number of process conditions such as pin length, parison wall thickness, parison temperature, pin diameters, pin shape, parison diameter, mold diameter to parison diameter and the parison diameter to pin diameter ratio. The most critical of these variables has been found to be the parison diameter to pin diameter ratio as it has been found that if this ratio is above 11:1 the blown bottle will have a central strut 28 with no perceptible reinforcing rib. On the other hand, if the ratio of parison diameter to pin diameter is controlled at 7:1 or less a web 29 is formed. The critical ratio is effective regardless of the shape of the pin and will also control the formation of the rib even while varying parison wall thickness and pin diameter.

While particular embodiments of the invention have been illustrated and described it will be obvious to those skilled in the art that various changes and modifications can be made without departgin from the spirit and scope of the invention and it is intended to cover in the appended claims all such changes and modifications that are within the scope of this invention.

What is claimed as new is:

1. A method of blow-molding a plastic container with internal reinforcing structure comprising the steps of extruding a hollow parison, closing the two halves of a blowing mold around said parison to pinch off the ends of said parison, pinching said parison in a limited area intermedaite the pinched off ends thereof by a pair of pins in substantial alignment on opposite sides of the two halves of the blowing mold, the parison and pins being so dimensioned that the ratio of the diameter of the parison to the diameter of the pins is no greater than 7:1, inflating said parison by an air blast to force its walls against the inside contours of the blowing mold cavity whereby a container is formed having inwardly projecting reinforcing members in the areas at which it was pinched intermediate the pinched-off ends and a reinforcing rib is formed in the container extending from said inwardly projecting reinforcing members.

2. A method of blow-molding a plastic container with internal reinforcing structure as claimed in claim 1 wherein the pinching of the parison intermediate its ends is controlled such that it is pinched to a thickness less than two times the wall thickness of the parison, whereby a continuous internal strut is formed across the container.

References Cited

UNITED STATES PATENTS

| | | | |
|---|---|---|---|
| 2,951,264 | 9/1960 | Bailey | 264—98 |
| 3,048,891 | 8/1962 | Maass | 264—98 |
| 3,120,679 | 2/1964 | Price et al. | 264—98 |
| 3,232,495 | 2/1966 | Schneider. | |
| 3,242,245 | 3/1966 | Greig et al. | 264—96 |
| 3,317,955 | 5/1967 | Scharman et al. | 264—94 X |

ROBERT F. WHITE, Primary Examiner

T. J. CARVIS, Assistant Examiner

U.S. Cl. X.R.

18—5